US012565895B1

(12) United States Patent
Zhu

(10) Patent No.: US 12,565,895 B1
(45) Date of Patent: *Mar. 3, 2026

(54) NECK FAN

(71) Applicant: Guangdong Aoyun Technology Co., Ltd., Huizhou (CN)

(72) Inventor: Xueping Zhu, Huizhou (CN)

(73) Assignee: Guangdong Aoyun Technology Co., Ltd., Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,625

(22) Filed: Oct. 31, 2024

Related U.S. Application Data

(63) Continuation-in-part of application No. 18/421,213, filed on Jan. 24, 2024, now Pat. No. 12,281,656.

(51) Int. Cl.
| | |
|---|---|
| *F04D 25/06* | (2006.01) |
| *A42B 3/28* | (2006.01) |
| *F04D 25/08* | (2006.01) |
| *G08B 5/36* | (2006.01) |
| *H02J 7/00* | (2006.01) |

(52) U.S. Cl.
CPC .......... *F04D 25/0673* (2013.01); *A42B 3/286* (2013.01); *F04D 25/08* (2013.01); *G08B 5/36* (2013.01); *H02J 7/0047* (2013.01); *H02J 7/0029* (2013.01)

(58) Field of Classification Search
CPC .............. F04D 25/166; F04D 25/0673; A41D 13/0025; A41D 20/005; A42B 3/286
See application file for complete search history.

(56) References Cited

U.S. PATENT DOCUMENTS

2017/0370596 A1* 12/2017 Lee ......................... A42B 3/286
2021/0368872 A1* 12/2021 Lee ......................... F04D 25/084

\* cited by examiner

*Primary Examiner* — Kenneth J Hansen
(74) *Attorney, Agent, or Firm* — Hemisphere Law, PLLC

(57) ABSTRACT

A neck fan includes a hanging main body and a first fan assembly. The hanging main body includes an inner end portion that is in contact with the neck of a user. The first fan assembly includes a straight-tube-shaped first fan shell. The first fan shell is connected to a lower end portion of the hanging main body; the first fan shell is provided with a third air inlet and a third air outlet; and the first fan assembly is configured to drive air flow to be blown from the third air inlet towards the inner end portion via the third air outlet.

20 Claims, 15 Drawing Sheets

NECK FAN

CROSS-REFERENCE TO RELATED APPLICATIONS

This application is a Continuation-in-Part of the U.S. application Ser. No. 18/421,213 filed on Jan. 24, 2024, and entitled "NECK FAN" now pending, the entire disclosures of which are incorporated herein by reference.

TECHNICAL FIELD

The present disclosure relates to the field of fans, and in particular, to a neck fan.

BACKGROUND

As portable cooling equipment, a portable fan has received widespread attentions and been widely applied in hot seasons in recent years, especially a neck fan. The neck fan can be carried around and free the hands, and are favored by the majority of users.

However, as people continue to pursue comfortable experiences, they have gradually increasing expectations for the performance of the neck fan. In the scorching summer, users hope to achieve a faster and more direct cooling effect in a high-temperature environment, but the design of the traditional neck fan fails to fully meet this demand.

For this purpose, the present disclosure provides a neck fan that allows air from the fan to be blown more directly and centrally towards a user, thereby providing a more comfortable user experience in a hot environment. According to this design, the cooling effect of the neck fan is improved while the portability is achieved, so that the growing demand of the user for personalized and efficient cooling equipment is met.

SUMMARY

In order to overcome the shortcomings of the prior art, the present disclosure provides a neck fan that allows air from the fan to be blown more directly and centrally towards a user, thereby providing a more comfortable user experience in a hot environment and is convenient for the user to carry.

The technical solution used in the present disclosure to solve the technical problems is as follows:

The present disclosure provides a neck fan, including:

a hanging main body, wherein the hanging main body includes an inner end portion that is in contact with the neck of a user; and a first fan assembly, wherein the first fan assembly includes a straight-tube-shaped first fan shell; the first fan shell is connected to a lower end portion of the hanging main body; the first fan shell is provided with a third air inlet and a third air outlet; and the first fan assembly is configured to drive an air flow to be blown from the third air inlet towards the inner end portion via the third air outlet.

In an improvement of the present disclosure, a straight-tube-shaped first air guide chamber is arranged at the lower end portion of the hanging main body in a protruding manner; the first air guide chamber includes a first air inlet arranged at the lower end portion of the hanging main body and a first air outlet opposite to the first air inlet; the hanging main body includes an inner end portion that is in contact with the neck of a user; and the first air outlet faces the inner end portion.

The first fan assembly is located in the first air guide chamber; and the first fan assembly is configured to drive an air flow to be blown from the first air inlet towards the inner end portion via the first air outlet.

In an improvement of the present disclosure, a first accommodating chamber is inwards sunken in one side, close to the inner end portion, of the lower end portion of the hanging main body; and the first fan shell is detachably connected to the hanging main body and is located in the first accommodating chamber.

In an improvement of the present disclosure, several connection buckle slots are provided in an inner side of the hanging main body close to the first accommodating chamber; several connection buckles matched and clamped with the connection buckle slots are arranged on an outer wall of the first fan shell; and the first fan shell is in detachably buckled connection to the hanging main body.

In an improvement of the present disclosure, the neck fan is provided with a first air guide path that is inwards sunken; the first air guide path extends from the first air outlet to the inner end portion; and the first fan assembly drives the air flow to be blown out from the first air outlet towards the inner end portion along the first air guide path.

In an improvement of the present disclosure, a width of the first air guide path gradually decreases towards the inner end portion along the first air outlet; a width range of the first air guide path is 1 to 5 cm; a length range of the first air guide path is 8 to 16 cm; and a depth range of the first air guide path is 0 to 3 cm.

In an improvement of the present disclosure, a flexible first neck support is connected to the inner end portion; a first air inlet gap is formed between the first neck support and the inner end portion; the first fan assembly drives the air flow to be blown out from the first air outlet towards the first air inlet gap along the first air guide path.

In an improvement of the present disclosure, the neck fan includes a first outer shell and a first inner shell; the first air guide path is arranged on the first inner shell; and the first inner shell is in detachably buckled connection to the first outer shell.

In an improvement of the present disclosure, a straight-tube-shaped second air guide chamber is further arranged at a lower end portion of the neck fan in a protruding manner; the second air guide chamber includes a second air inlet arranged at the lower end portion of the hanging main body and a second air outlet opposite to the second air inlet; the second air outlet faces the inner end portion; a second fan assembly is arranged in the second air guide chamber; and the second fan assembly is configured to drive the air flow to be blown out from the second air inlet towards the inner end portion via the second air outlet.

In an improvement of the present disclosure, the neck fan is provided with a second air guide path that is inwards sunken; the second air guide path extends from the second air outlet to the inner end portion; and the second fan assembly drives the air flow to be blown out from the second air outlet towards the inner end portion along the second air guide path.

In an improvement of the present disclosure, a flexible second neck support is connected to the inner end portion; a second air inlet gap is formed between the second neck support and the inner end portion; the second fan assembly drives the air flow to be blown out from the second air outlet towards the second air inlet gap along the second air guide path.

In an improvement of the present disclosure, the neck fan includes a second outer shell and a second inner shell; the second air guide path is arranged on the second inner shell; and the second inner shell is in detachably buckled connection to the second outer shell.

In an improvement of the present disclosure, the neck fan further includes a first power supply assembly; the first power supply assembly is located inside the hanging main body; the first power supply assembly is electrically connected to the first fan assembly to supply power to the first fan assembly; the first power supply assembly includes a first battery and a first circuit board; and the first battery is electrically connected to the first circuit board to supply power to the first circuit board; the neck fan further includes a second power supply assembly; the second power supply assembly is located inside the hanging main body; the second power supply assembly is electrically connected to the second fan assembly to supply power to the second fan assembly; the second power supply assembly includes a second battery and a second circuit board; and the second battery is electrically connected to the second circuit board to supply power to the second circuit board.

In an improvement of the present disclosure, the first fan assembly includes a first motor and a first fan blade mounted on a rotating shaft of the first motor; the first air inlet is connected with a first air inlet hood; the first air inlet hood is provided with several first air inlet holes; the first air outlet is connected to a first air outlet hood; and the first air outlet hood is provided with several first air outlet holes.

In an improvement of the present disclosure, the second fan assembly includes a second motor and a second fan blade mounted on a rotating shaft of the second motor; the second air inlet and a fourth air inlet are connected with a second air inlet hood; the second air inlet hood is provided with several second air inlet holes; the second air outlet and a fourth air outlet are connected with a second air outlet hood; and the second air outlet hood is provided with several second air outlet holes.

In an improvement of the present disclosure, the hanging main body is a U-shaped hanging main body; the hanging main body includes a first bracket, a second bracket, and a bracket connector; the first bracket is detachably connected to the second bracket through the bracket connector; and the bracket connector is a flexible bracket connector.

In an improvement of the present disclosure, the bracket connector is provided with a mounting through hole; the first bracket is provided with a first connection end connected to the bracket connector; the first connection end is detachably inserted into one end of the mounting through hole; the second bracket is provided with a second connection end connected to the bracket connector; and the second connection end is detachably inserted into the other end of the mounting through hole.

In an improvement of the present disclosure, a concave-convex first buckle is arranged at the first connection end; the bracket connector is provided with a first buckle slot that is matched and clamped with the first buckle; a concave-convex second buckle is arranged at the second connection end; and the bracket connector is provided with a second buckle slot that is matched and clamped with the second buckle.

In an improvement of the present disclosure, the first air guide chamber is located inside the first bracket; the first bracket is further provided with a first mounting chamber; and a first power supply assembly is located inside the first mounting chamber.

In an improvement of the present disclosure, the second air guide chamber is located inside the second bracket; the second bracket is further provided with a second mounting chamber; and the second power supply assembly is located inside the second mounting chamber.

In an improvement of the present disclosure, the first bracket is further provided with a first button switch, a first charging interface, and a first indicator lamp module; and the first button switch, the first charging interface, and the first indicator lamp module are all electrically connected to the first power supply assembly; the second bracket is further provided with a second button switch, a second charging interface, and a second indicator lamp module; and the second button switch, the second charging interface, and the second indicator lamp module are all electrically connected to the second power supply assembly.

In an improvement of the present disclosure, the neck fan further includes a first charging control module, a first battery protection module, a first charging indicator module, a first main control module, and a first boost module which are electrically connected to the first circuit board;

the first charging interface and the first charging control module are both electrically connected to the first battery; the first charging indicator module is connected to the first charging control module; the first charging interface and the first charging control module are configured to charge the first battery; the first battery level indicator lamp module is configured to display a state of charging; the first battery protection module is electrically connected to the first charging control module and the first battery to protect the first battery;

the first main control module, the first boost module, and a first motor are all electrically connected to the first battery; the first button switch and the first indicator lamp module are electrically connected to the first main control module; the first button switch is configured to send a first fan working signal; the first main control module is configured to: receive the first fan working signal and drive the first boost module to receive and boost an output voltage of the first battery, to drive the first motor to work; and the first indicator lamp module is configured to display turning on or turning off of the neck fan.

In an improvement of the present disclosure, the neck fan further includes a second charging control module, a second battery protection module, a second charging indicator module, a second main control module, and a second boost module which are electrically connected to the second circuit board;

the second charging interface and the second charging control module are both electrically connected to the second battery; the second charging indicator module is connected to the second charging control module; the second charging interface and second first charging control module are configured to charge the second battery; the second charging indicator lamp module is configured to display a state of charging; the second battery protection module is electrically connected to the second charging control module and the second battery to protect the second battery;

the second main control module, the first boost module, and a second motor are all electrically connected to the second battery; the second button switch and the first indicator lamp module are electrically connected to the second main control module; the second button switch is configured to send a second fan working signal; the second main control module is configured to: receive the second fan working signal and drive the first boost module to receive and boost an output voltage of the first battery, to drive the second motor to work; and the first indicator lamp module is configured to display turning on or turning off of the neck fan.

In an improvement of the present disclosure, the first bracket is provided with a first conductive end; the second bracket is provided with a second conductive end; when the first conductive end is communicated to the second conductive end, the first button switch is electrically connected to the first main control module and the second main control module respectively, and the second button switch is electrically connected to the first main control module and the second main control module respectively; the first button switch or the second button switch is configured to send a third fan working signal;

the first main control module is configured to: receive the third fan working signal and drive the first boost module to receive and boost the output voltage of the first battery, to drive the first motor to work; and the second main control module is configured to: receive the third fan working signal and drive the second boost module to receive and boost the output voltage of the second battery, to drive the second motor to work.

Beneficial effects of the present disclosure are as follows: The present disclosure provides a neck fan, including a hanging main body, wherein the hanging main body includes an inner end portion that is in contact with the neck of a user; and a first fan assembly, wherein the first fan assembly includes a straight-tube-shaped first fan shell; the first fan shell is connected to a lower end portion of the hanging main body; the first fan shell is provided with a third air inlet and a third air outlet; and the first fan assembly is configured to drive air flow to be blown from the third air inlet towards the inner end portion via the third air outlet. Through the above structure, due to the straight-tube shape of the first fan assembly, the neck fan is formed into a vertical blowing type fan capable of blowing air in a vertical direction. The first fan assembly can drive the air flow to be blown from the third air inlet towards the inner end portion via the third air outlet, greatly improving the air blowing efficiency. A user can directly feel the cool air blown directly to the neck when using the neck fan, thereby improving the overall performance of the fan and improving the overall quality and user experience of the product.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Embodiment I

Figure 1:
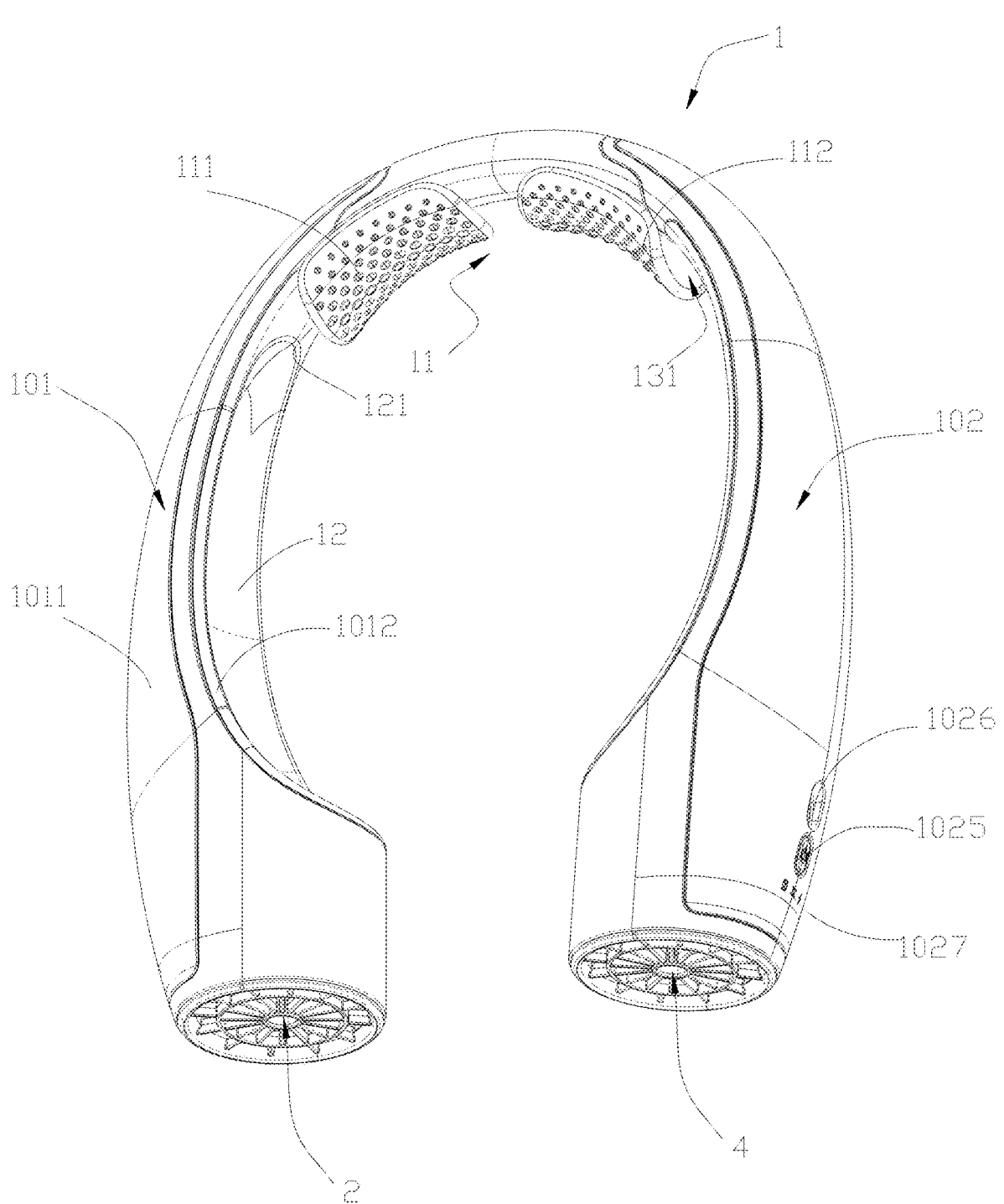
FIG. 1 is a schematic diagram of an entire structure of Embodiment I of the present disclosure.
Figure 2:
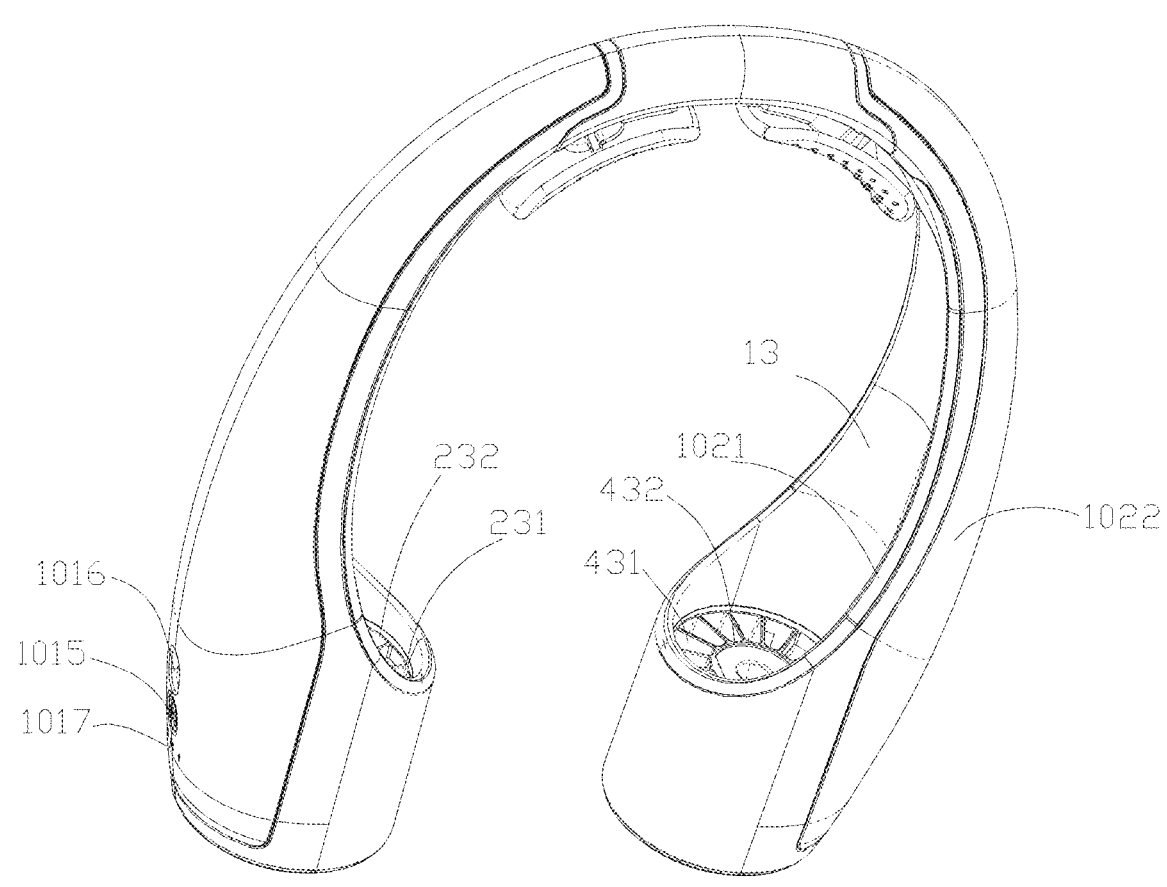
FIG. 2 is a schematic diagram of an entire structure of another viewing angle of Embodiment I of the present disclosure.
Figure 3:
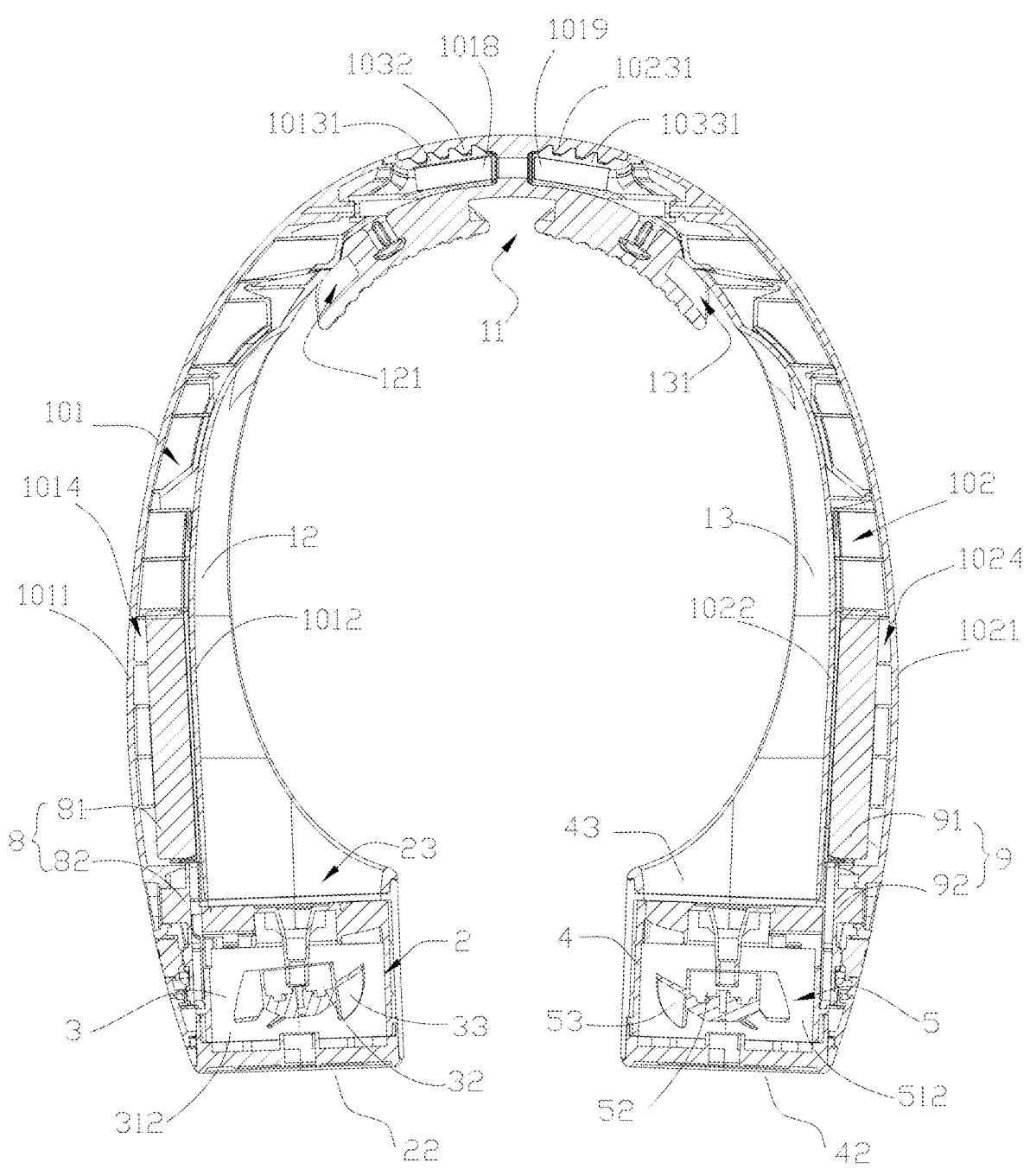
FIG. 3 is a sectional view of a neck fan of Embodiment I of the present disclosure.
Figure 4:
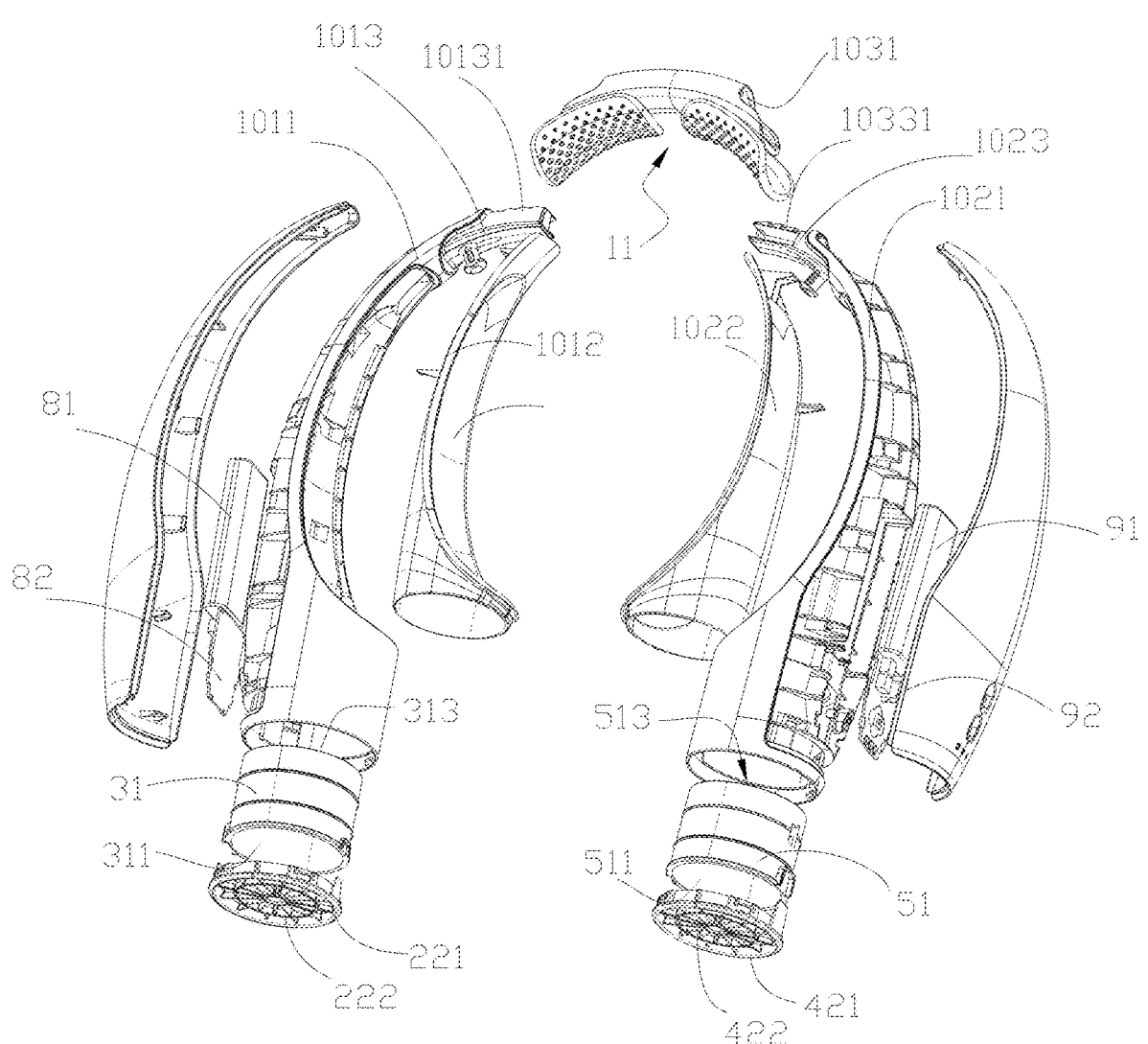
FIG. 4 is an exploded view of Embodiment I of the present disclosure.
Figure 5:
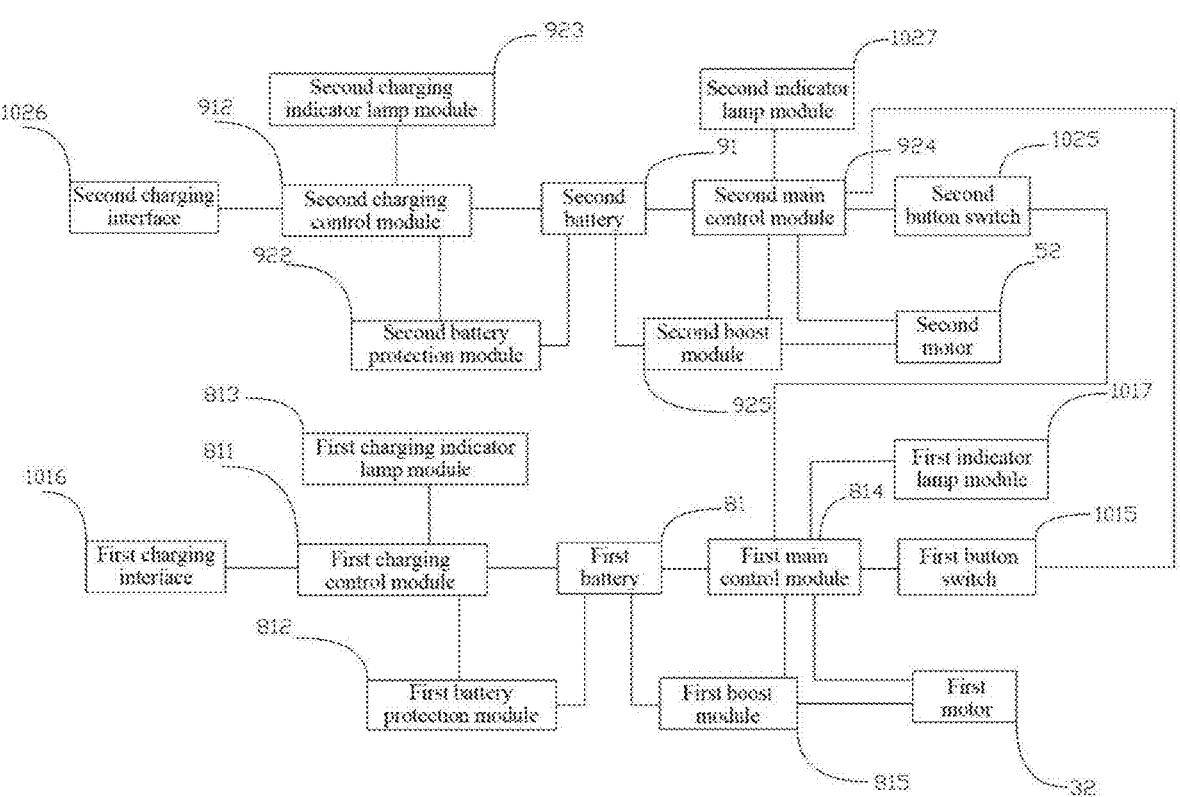
FIG. 5 is a schematic block diagram of Embodiment I of the present disclosure.
Figure 6:
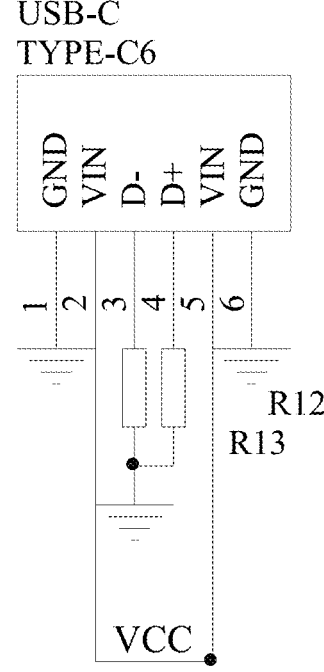
FIG. 6 is a circuit diagram of a first charging interface according to the present disclosure.
Figure 7:
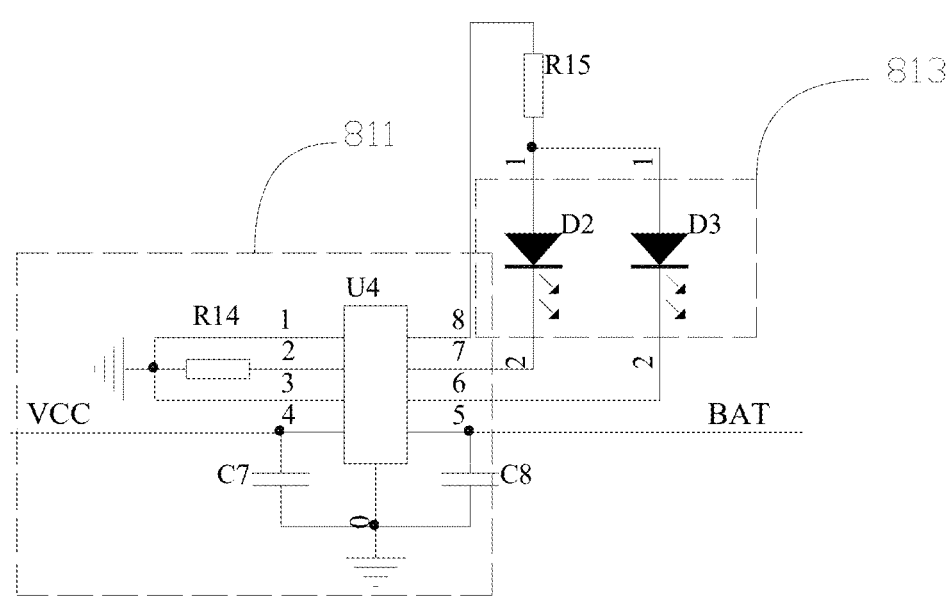
FIG. 7 is a circuit diagram of a first charging control module of the present disclosure.
Figure 8:
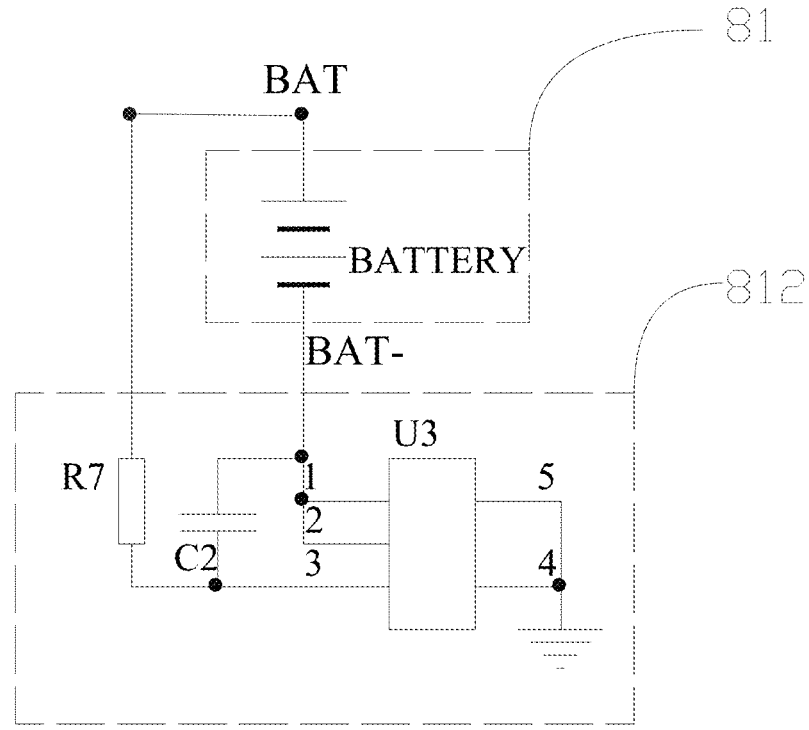
FIG. 8 is a circuit diagram of a first battery according to the present disclosure.

Referring to FIG. 1 to FIG. 10, a neck fan includes a hanging main body 1. A straight-tube-shaped first air guide chamber 2 is arranged at a lower end portion of the hanging main body 1 in a protruding manner; the first air guide chamber 2 includes a first air inlet 22 arranged at the lower end portion of the hanging main body 1 and a first air outlet 23 opposite to the first air inlet 22; the hanging main body 1 includes an inner end portion 11 that is in contact with the neck of a user; the first air outlet 23 faces the inner end portion 11; and a first fan assembly 3, wherein the first fan assembly 3 is located in the first air guide chamber 2; and the first fan assembly 3 is configured to drive an air flow to flow from the first air inlet 22 to the inner end portion 11 via the first air outlet 23. Through the above structure, due to the straight-tube shape of the first air guide chamber 2, the neck fan forms a vertical blowing type fan capable of blowing air in a vertical direction. The first fan assembly 3 can drive the air flow to be blown from the first air inlet 22 to the inner end portion 11 through the first air outlet 23, greatly improving the air blowing efficiency. A user can directly feel the cool air blown directly to the neck when using the neck fan. This improves the overall performance of the fan. Furthermore, since the first air guide chamber 2 is a straight-tube-shaped cavity integrally protruding out of the hanging main body 1, this design improves the overall sense of beauty and sense of design of the product, helps to improve the wearing comfort of the neck fan, and improves the overall quality and user experience of the product.

In this embodiment, the neck fan is provided with a first air guide path 12 that is inwards sunken; the first air guide path 12 extends from the first air outlet 23 to the inner end portion 11; and the first fan assembly 3 drives the air flow to be blown out from the first air outlet 23 towards the inner end portion 11 along the first air guide path 12. Further, a flexible first neck support 111 is connected to the inner end portion 11; a first air inlet gap 121 is formed between the first neck support 111 and the inner end portion 11; the first fan assembly 3 drives the air flow to be blown out from the first air outlet 23 towards the first air inlet gap 121 along the first air guide path 12. The first neck support 111 can be a silica gel neck support, a plastic neck support, a rubber neck support, or the like. Through the above structure, when the air flow is blown out from the first air outlet 23, under the guidance of the first air guide path 12 that is inwards sunken, the air flow will be blown towards the inner end portion 11 along the first air guide path 12. Due to the first air inlet gap 121, the air flow can be blocked in the gap, so that when a user wears the neck fan, the user can have a stronger feeling about the air flow at the inner end portion 11, and the heat dissipation effect is enhanced; and furthermore, the flexible neck support provides a more comfortable supporting effect for the user, which improves the user experience.

In this embodiment, a width of the first air guide path gradually decreases towards the inner end portion along the first air outlet; a width range of the first air guide path is 1 to 5 cm; a length range of the first air guide path is 8 to 16 cm; and a depth range of the first air guide path is 0 to 3 cm.

In this embodiment, the hanging main body 1 is a U-shaped hanging main body 1; the hanging main body 1 includes a first bracket 101, a second bracket 102, and a bracket connector 103; the first bracket 101 is detachably connected to the second bracket 102 through the bracket connector 103; and the bracket connector is a flexible bracket connector 103. Specifically, the bracket connector 103 can be a silica gel connector, a plastic connector, a rubber connector, or the like.

In this embodiment, the first bracket 101 a first outer shell 1011 and a first inner shell 1012; the first air guide path 12 is arranged on the first inner shell 1012; and the first inner shell 1012 is detachably connected to the first outer shell 1011 through a buckle. It is convenient for a user to open and mount the first bracket 101 for maintenance.

In this embodiment, a diameter of the first air inlet 22 is within a range of 30 mm to 60 mm, and a diameter of the first air outlet 23 is within a range of 30 mm to 60 mm. Through the above structure, an appropriate diameter range helps to achieve a balanced air flowrate, so that the fan can provide a sufficient air flow and maintain a good cooling effect. Furthermore, it helps to rationalize the overall structure, and the neck fan is convenient to carry and use.

In this embodiment, a straight-tube-shaped second air guide chamber 4 is further arranged at a lower end portion of the neck fan in a protruding manner; the second air guide chamber 4 includes a second air inlet 42 arranged at the lower end portion of the hanging main body 1 and a second air outlet 43 opposite to the second air inlet 42; the second air outlet 43 faces the inner end portion 11; a second fan assembly 5 is arranged in the second air guide chamber 4; and the second fan assembly 5 is configured to drive the air flow to be blown out from the second air inlet 42 towards the inner end portion 11 via the second air outlet 43. Through the above structure, due to the straight-tube shape of the second air guide chamber 4, the neck fan forms a vertical blowing type fan capable of blowing air in a vertical direction, so that the second fan assembly 5 can drive the air flow to be blown from the second air inlet 42 to the inner end portion 11 through the second air outlet 43, greatly improving the air blowing efficiency. A user can directly feel the cool air when using the neck fan. This improves the overall performance of the fan. Furthermore, since the second air guide chamber 4 is a straight-tube-shaped cavity integrally protruding out of the hanging main body 1, this design improves the overall sense of beauty and sense of design of the product, helps to improve the wearing comfort of the neck fan, and improves the overall quality and user experience of the product.

In this embodiment, the neck fan is provided with a second air guide path 13 that is inwards sunken; the second air guide path 13 extends from the second air outlet 43 to the inner end portion 11; and the second fan assembly 5 drives the air flow to be blown out from the second air outlet 43 towards the inner end portion 11 along the second air guide path 13. Further, a flexible second neck support 112 is connected to the inner end portion 11; a second air inlet gap 131 is formed between the second neck support 112 and the inner end portion 11; the second fan assembly 5 drives the air flow to be blown out from the second air outlet 43 towards the second air inlet gap 131 along the second air guide path 13. The second neck support 112 can be a silica gel neck support, a plastic neck support, a rubber neck support, or the like. Through the above structure, when the air flow is blown out from the second air outlet 43, under the guidance of the second air guide path 13 that is inwards sunken, the air flow will be blown towards the inner end portion 11 along the second air guide path 13. Due to the second air inlet gap 131, the air flow can be blocked in the gap, so that when a user wears the neck fan, the user can have a stronger feeling about the air flow at the inner end portion 11 more strongly, and the heat dissipation effect is enhanced; and furthermore, the flexible neck support provides a more comfortable supporting effect for the user, which improves the user experience.

In this embodiment, a width of the second air guide path gradually decreases towards the inner end portion along the second air outlet; a width range of the second air guide path is 1 to 5 cm; a length range of the second air guide path is 8 to 16 cm; and a depth range of the second air guide path is 0 to 3 cm.

In this embodiment, the second bracket 102 includes a second outer shell 1021 and a second inner shell 1022; the second air guide path 13 is arranged on the second inner shell 1022; and the second inner shell 1022 is detachably connected to the second outer shell 1021 through a buckle. It is convenient for a user to open and mount the second bracket 102 for maintenance.

In this embodiment, the neck fan further includes a first power supply assembly 8; the first power supply assembly 8 is located inside the hanging main body 1; the first power supply assembly 8 is electrically connected to the first fan assembly 3 to supply power to the first fan assembly 3; the first power supply assembly 8 includes a first battery 81 and a first circuit board 82; and the first battery 81 is electrically connected to the first circuit board 82 to supply power to the first circuit board 82. The neck fan further includes a second power supply assembly 9; the second power supply assembly 9 is located inside the hanging main body 1; the second power supply assembly 9 is electrically connected to the second fan assembly 5 to provide power to the second fan assembly 5; the second power supply assembly 9 includes a second battery 91 and a second circuit board 92; and the second battery 91 is electrically connected to the second circuit board 92 to supply power to the second circuit board 92. Through the above structure, the first power supply assembly 8 is arranged inside the hanging main body 1. This design can improve the overall appearance of the neck fan and effectively supply power to the first fan assembly 3, to ensure the reliability of the product. The second power supply assembly 9 is arranged inside the hanging main body 1. This design can improve the overall appearance of the neck fan and effectively supply power to the second fan assembly 5, to ensure the reliability of the product.

In this embodiment, the first fan assembly 3 includes a first fan shell 31, a first motor 32 fixedly mounted inside the first fan shell 31, and a first fan blade 33 mounted on a rotating shaft of the first motor 32; the first fan shell 31 is provided with a third air inlet 311, a first air duct 312, and a third air outlet 313; and the first air inlet 22, the third air inlet 311, the first air duct 312, the third air outlet 313, the first air guide chamber 2, and the first air outlet 23 are connected to each other in sequence. Through the above structural design, the first fan assembly 3 in this embodiment is provided with the independent outer shell, which facilitates independent mounting and replacement of the fan.

In another implementation, the first fan assembly 3 includes a first motor 32 and a first fan blade 33 mounted on a rotating shaft of the first motor 32; the first air inlet 22 is connected with a first air inlet hood 221; the first air inlet hood 221 is provided with several first air inlet holes 222; the first air outlet 23 is connected to a first air outlet hood 231; and the first air outlet hood 231 is provided with several first air outlet holes 232. Through the above structure, the design of a fan shell is omitted in this case, which saves the cost. Furthermore, a direction of the air flow is effectively achieved. The design of the first air inlet hood 221 and the first air outlet hood 231 is conducive to preventing other debris, such as hairs and paper scraps, from being sucked into the fan, which is conducive to maintaining the safety of the fan.

In this embodiment, the second fan assembly 5 includes a second fan shell 51, a second motor 52 fixedly mounted inside the second fan shell 51, and a second fan blade 53 mounted on a rotating shaft of the second motor 52; the second fan shell 51 is provided with a fourth air inlet 511, a second air duct 512, and a fourth air outlet 513; and the second air inlet 42, the fourth air inlet 511, the second air duct 512, the fourth air outlet 513, the second air guide chamber 4, and the first air outlet 23 are connected to each other in sequence. Through the above structural design, the first fan assembly 3 in this embodiment is provided with the independent outer shell, which facilitates independent mounting and replacement of the fan.

In some other embodiments, the second fan assembly 5 includes a second motor 52 and a second fan blade 53 mounted on a rotating shaft of the second motor 52; the second air inlet 42 and a fourth air inlet 511 are connected with a second air inlet hood 421; the second air inlet hood 421 is provided with several second air inlet holes 422; the second air outlet 43 and a fourth air outlet 513 are connected with a second air outlet hood 431; and the second air outlet hood 431 is provided with several second air outlet holes 432. Through the above structure, the design of a fan shell is omitted in this case, which saves the cost. Furthermore, a direction of the air flow is effectively achieved. The design of the second air inlet hood 421 and the second air outlet hood 431 is conducive to preventing other debris, such as hairs and paper scraps, from being sucked into the fan, which is conducive to maintaining the safety of the fan.

In this embodiment, the bracket connector 103 is provided with a mounting through hole 1031; the first bracket 101 is provided with a first connection end 1013 connected to the bracket connector 103; the first connection end 1013 is detachably inserted into one end of the mounting through hole 1031; the second bracket 102 is provided with a second connection end 1023 connected to the bracket connector

103; and the second connection end 1023 is detachably inserted into the other end of the mounting through hole 1031.

Further, a concave-convex first buckle 10131 is arranged at the first connection end 1013; the bracket connector 103 is provided with a first buckle slot 1032 that cooperates with the first buckle 10131; a concave-convex second buckle 10331 is arranged at the second connection end 1023; and the bracket connector 103 is provided with a second buckle slot 10231 that cooperates with the second buckle 10331. Through the above structure, the bracket connector 103 is a flexible silica gel connector. After the bracket connector 103 is bent to an angle, the first bracket 101 and the second bracket 102 can be easily inserted into the mounting through hole 1031. The first bracket 101 is in clamping fit with the first buckle slot 1032 on an inner wall of the bracket connector 103 through the concave-convex first buckle 10131 arranged at the first connection end 1013, and the second bracket 102 is in clamping fit with the second buckle slot 10231 on the inner wall of the bracket connector 103 through the concave-convex second buckle 10331 arranged at the second connection end 1023, so that it is convenient to mount and connect the first bracket 101 to the second bracket 102 to form a complete neck fan.

In this embodiment, the first air guide chamber 2 is located inside the first bracket 101; the first bracket 101 is further provided with a first mounting chamber 1014; and the first power supply assembly 8 is located inside the first mounting chamber 1014. The second air guide chamber 4 is located inside the second bracket 102; the second bracket 102 is further provided with a second mounting chamber 1024; and the second power supply assembly 9 is located inside the second mounting chamber 1024.

In this embodiment, the first bracket 101 is further provided with a first button switch 1015, a first charging interface 1016, and a first indicator lamp module 1017; and the first button switch 1015, the first charging interface 1016, and the first indicator lamp module 1017 are all electrically connected to the first power supply assembly 8. The second bracket 102 is further provided with a second button switch 1025, a second charging interface 1026, and a second indicator lamp module 1027; and the second button switch 1025, the second charging interface 1026, and the second indicator lamp module 1027 are all electrically connected to the second power supply assembly 9. Through the above structure, both the first button switch 1015 and the second button switch 1025 are configured to turn on or turn off the neck fan. The first charging interface 1016 and the second charging interface 1026 are configured to charge the first battery 81 and the second battery 91, respectively. The first indicator lamp module 1017 and the second indicator lamp module 1027 can be configured to: display whether the fan is in an ON or OFF state and display a wind rating of the fan.

In this embodiment, the neck fan further includes a first charging control module 811, a first battery protection module 812, a first charging indicator module 813, a first main control module 814, and a first boost module 815 which are electrically connected to the first circuit board 82.

The first charging interface 1016 and the first charging control module 811 are both electrically connected to the first battery 81; the first charging indicator module 813 is connected to the first charging control module 811; the first charging interface 1016 and the first charging control module 811 are configured to charge the first battery 81; the first battery level indicator lamp module 813 is configured to display a state of charging; and the first battery protection module 812 is electrically connected to the first charging control module 811 and the first battery 81 to protect the first battery 81.

The first main control module 814, the first boost module 815, and a first motor 32 are all electrically connected to the first battery 81; the first button switch 1015 and the first indicator lamp module 1017 are electrically connected to the first main control module 814; and the first indicator lamp module 1017 is configured to display turning on or turning off of the neck fan.

In this embodiment, the neck fan further includes a second charging control module 921, a second battery protection module 922, a second charging indicator module 923, a second main control module 924, and a second boost module 925 which are electrically connected to the second circuit board 92.

The second charging interface 1026 and the second charging control module 921 are both electrically connected to the second battery 91; the second charging indicator module 913 is connected to the second charging control module 921; the second charging interface 1026 and second first charging control module 921 are configured to charge the second battery 91; the second charging indicator lamp module 923 is configured to display a state of charging; and the second battery protection module 922 is electrically connected to the second charging control module 921 and the second battery 91 to protect the second battery 91.

The second main control module 924, the first boost module 925, and a second motor 52 are all electrically connected to the second battery 91; the second button switch 1025 and the second indicator lamp module 1027 are electrically connected to the second main control module 924; and the second indicator lamp module 1027 is configured to display turning on or turning off of the neck fan.

In this embodiment, the first bracket 101 is provided with a first conductive end 1018; the second bracket 102 is provided with a second conductive end 1019; when the first conductive end 1018 is communicated to the second conductive end 1019, the first button switch 1015 is electrically connected to the first main control module 814 and the second main control module 924 respectively, and the second button switch 1025 is electrically connected to the first main control module 814 and the second main control module 924 respectively; and the first button switch 1015 or the second button switch 1025 is configured to send a third fan working signal.

The first main control module 814 is configured to: receive the third fan working signal and drive the first boost module 815 to receive and boost the output voltage of the first battery 81, to drive the first motor 32 to work; and the second main control module 924 is configured to: receive the third fan working signal and drive the second boost module 925 to receive and boost the output voltage of the second battery 91, to drive the second motor 52 to work.

In this embodiment, the first bracket 101 and the second bracket 102 can be regarded as two independent fans electrically connected to each other to form the neck fan. The circuit diagrams of various circuit modules included in the two independent fans are the same.

Through the above structure, the first bracket 101 and the second bracket 102 are combined and spliced to form the complete U-shaped neck fan. At this time, the first conductive end 1018 is in conductive connection with the second conductive end 1019. When the user presses the first button switch 1015 or the second button switch 1025, the third fan working signal can be sent. At this time, after receiving the third fan working signal, the first main control module 814 drives the first boost module 815 to receive and boost the output voltage of the first battery 81, thereby driving the first motor 32 to work. The rotation of the first motor 32 can drive a first fan blade 33 to rotate, achieving the air blowing effect of the first fan assembly. After receiving the third fan working signal, the second main control module 924 drives the second boost module 925 to receive and boost the output voltage of the second battery 91, thereby driving the second motor 52 to operate. The rotation of the second motor 52 can drive a second fan blade 53 to rotate, achieving the air blowing effect of the second fan assembly.

Figure 9:
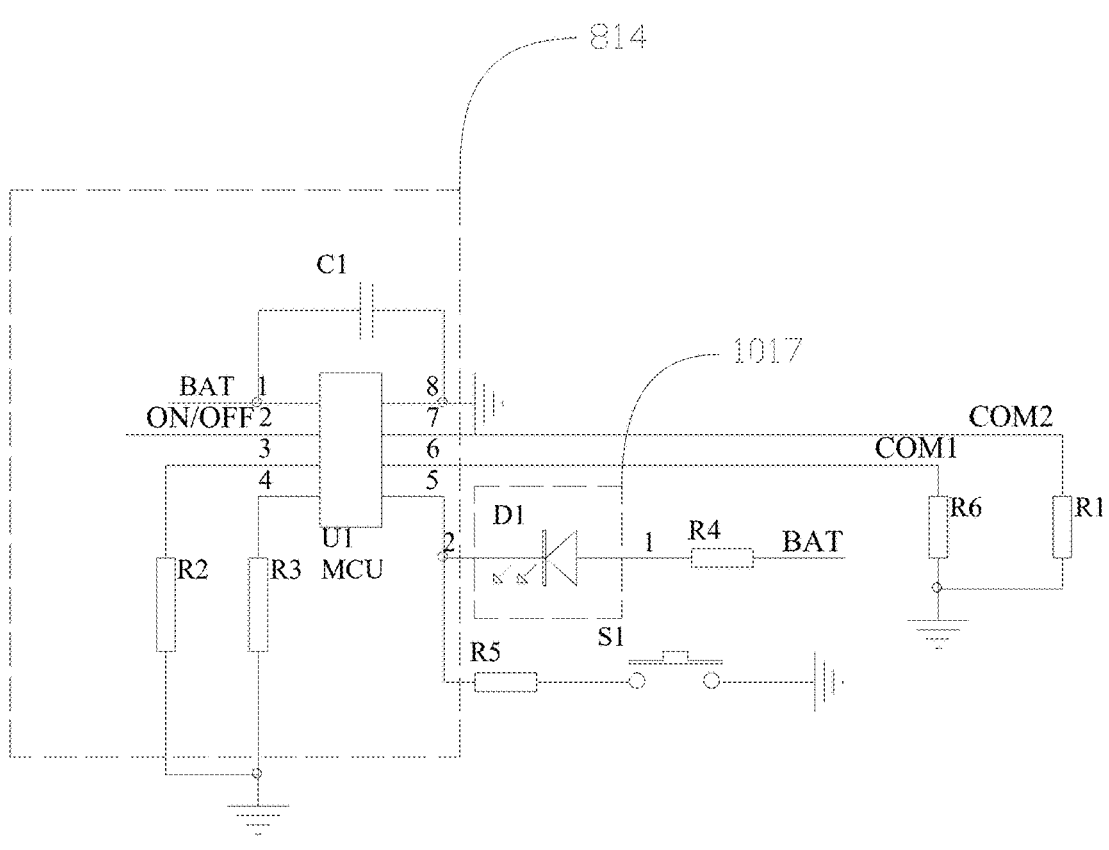
FIG. 9 is a circuit diagram of a first main control module of the present disclosure.
Figure 10:
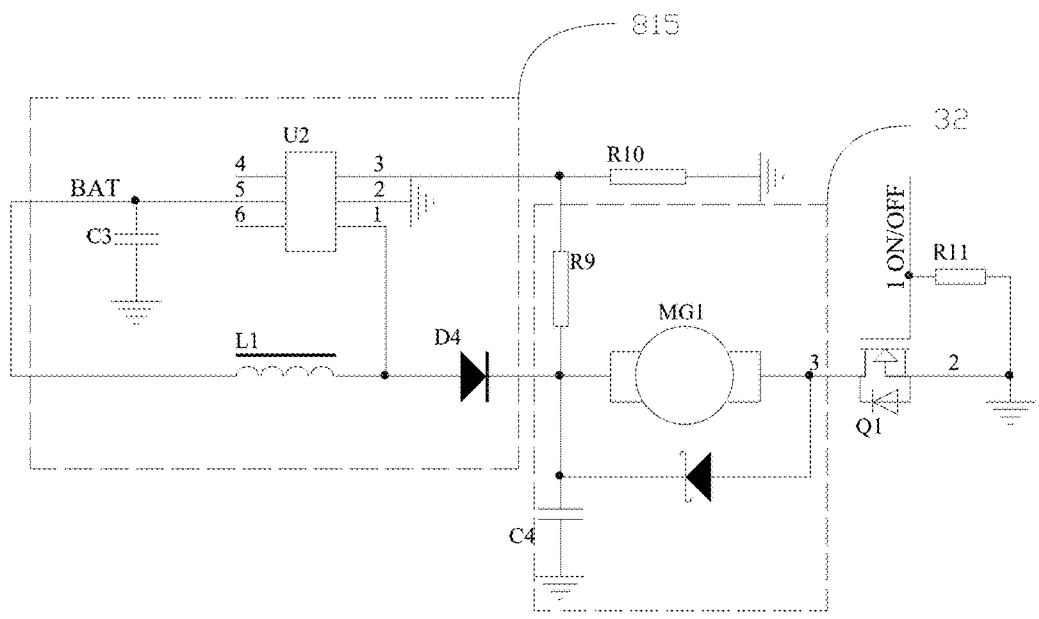
FIG. 10 is a circuit diagram of a first boost module and a first motor of the present disclosure.
Figure 11:
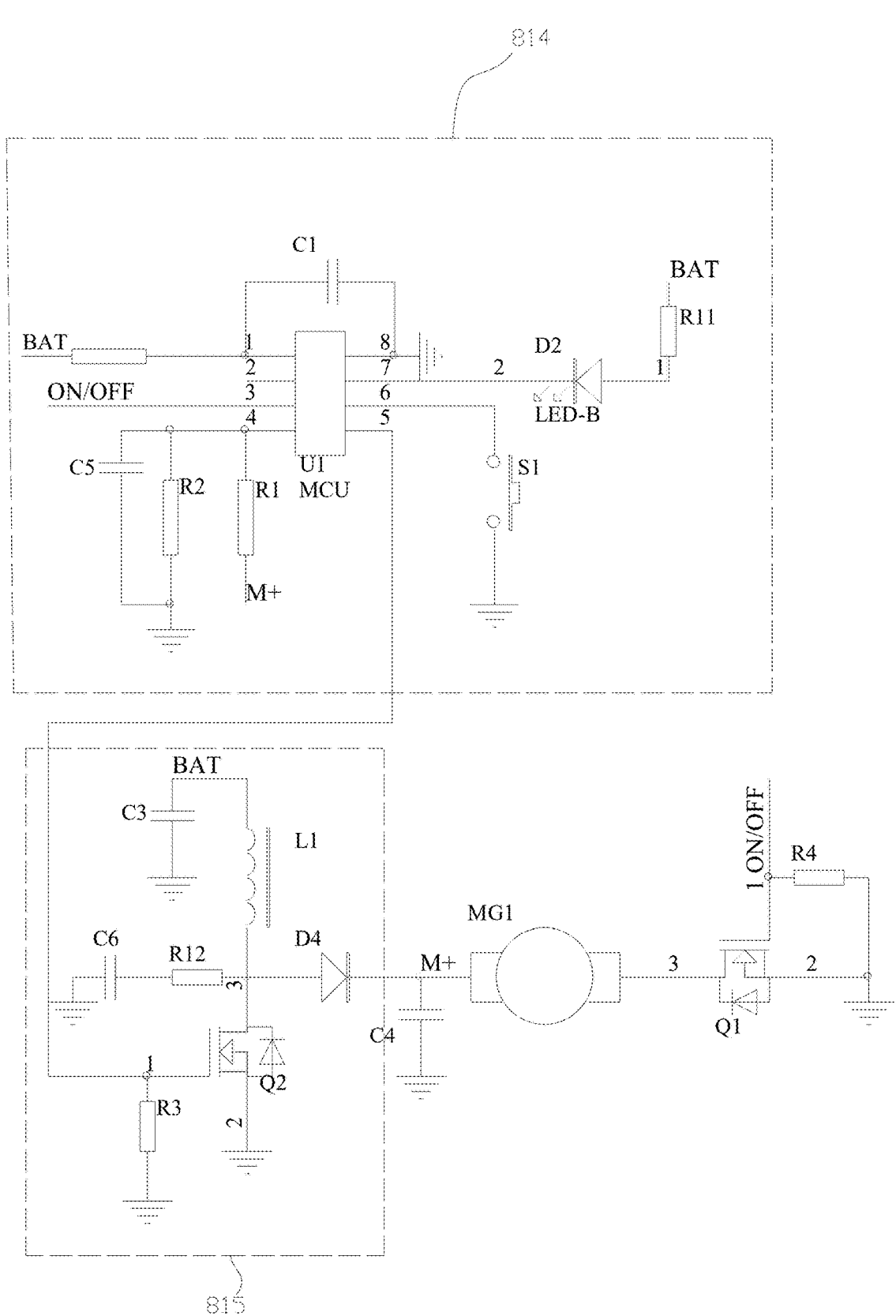
FIG. 11 is a circuit diagram of a first main control module, a first boost module and a first motor of another embodiment of the present disclosure.
Figure 12:
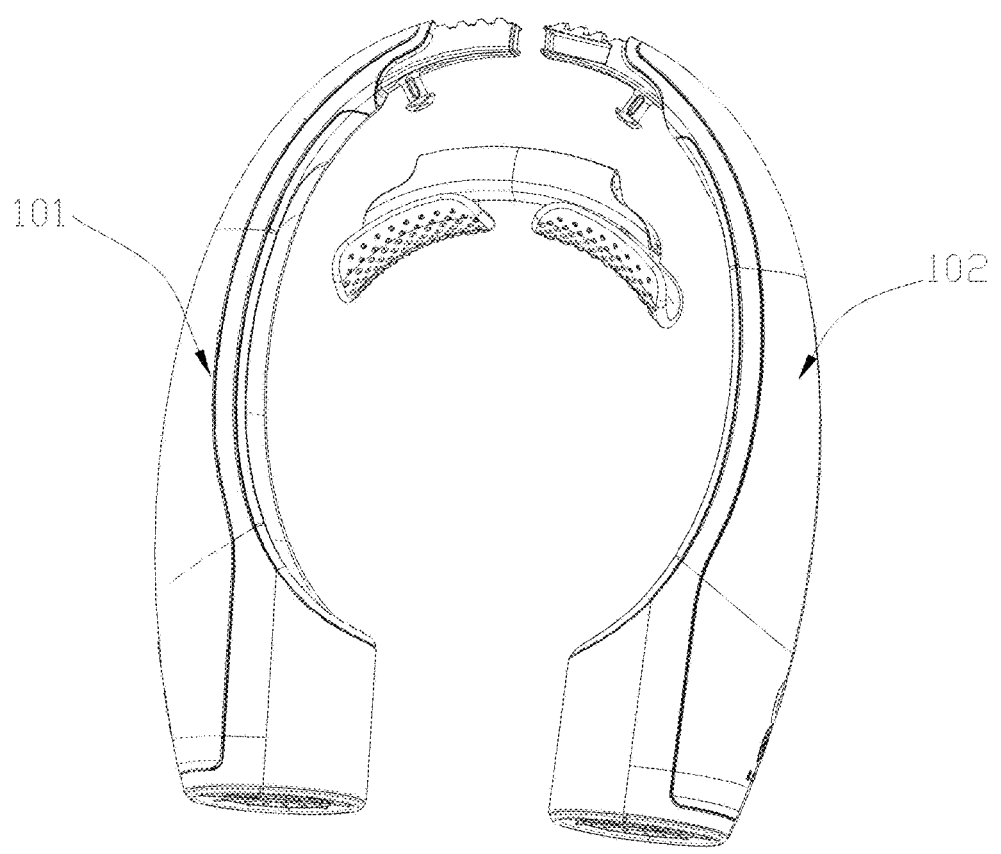
FIG. 12 is a schematic diagram of an entire structure of Embodiment II of the present disclosure.
Figure 13:
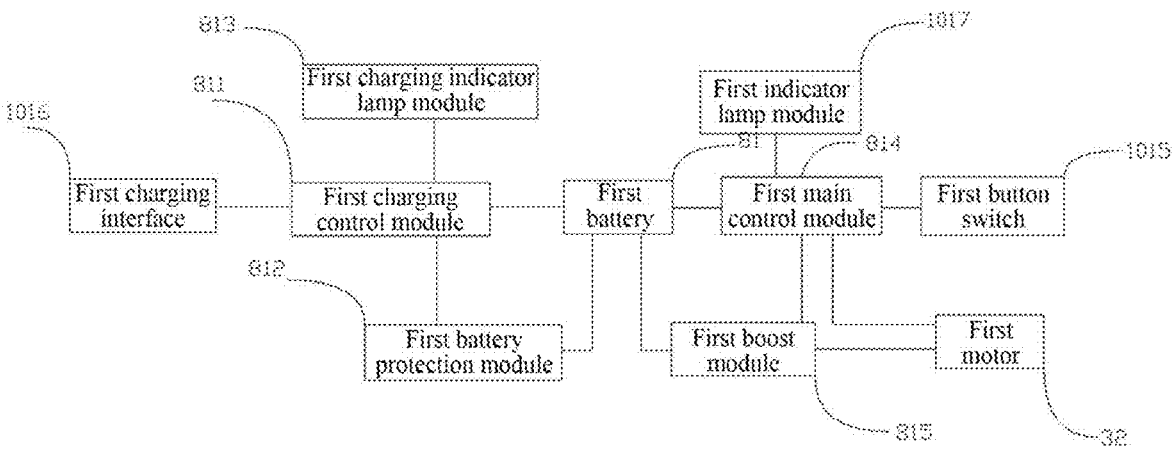
FIG. 13 is a schematic block diagram of a first bracket of Embodiment II of the present disclosure.
Figure 14:
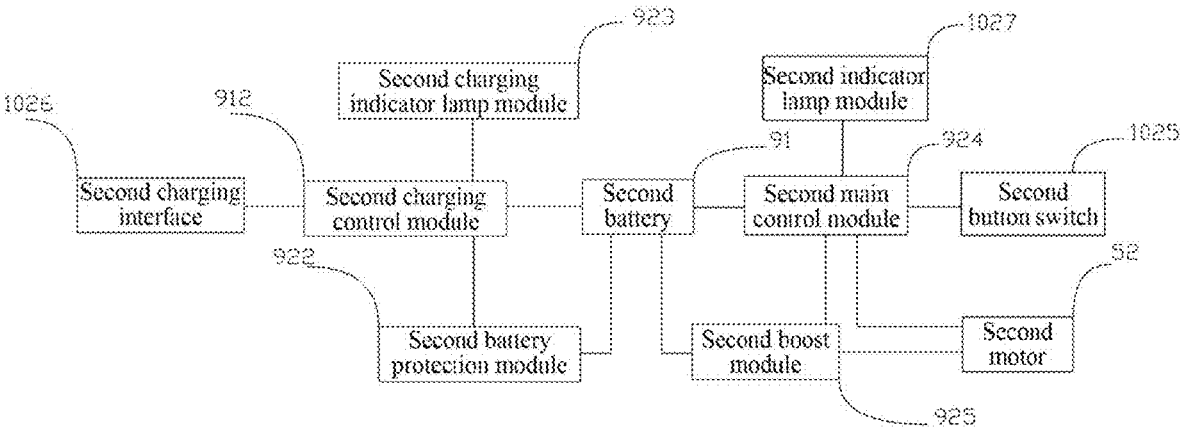
FIG. 14 is a schematic block diagram of a second bracket of Embodiment II of the present disclosure.
Figure 15:
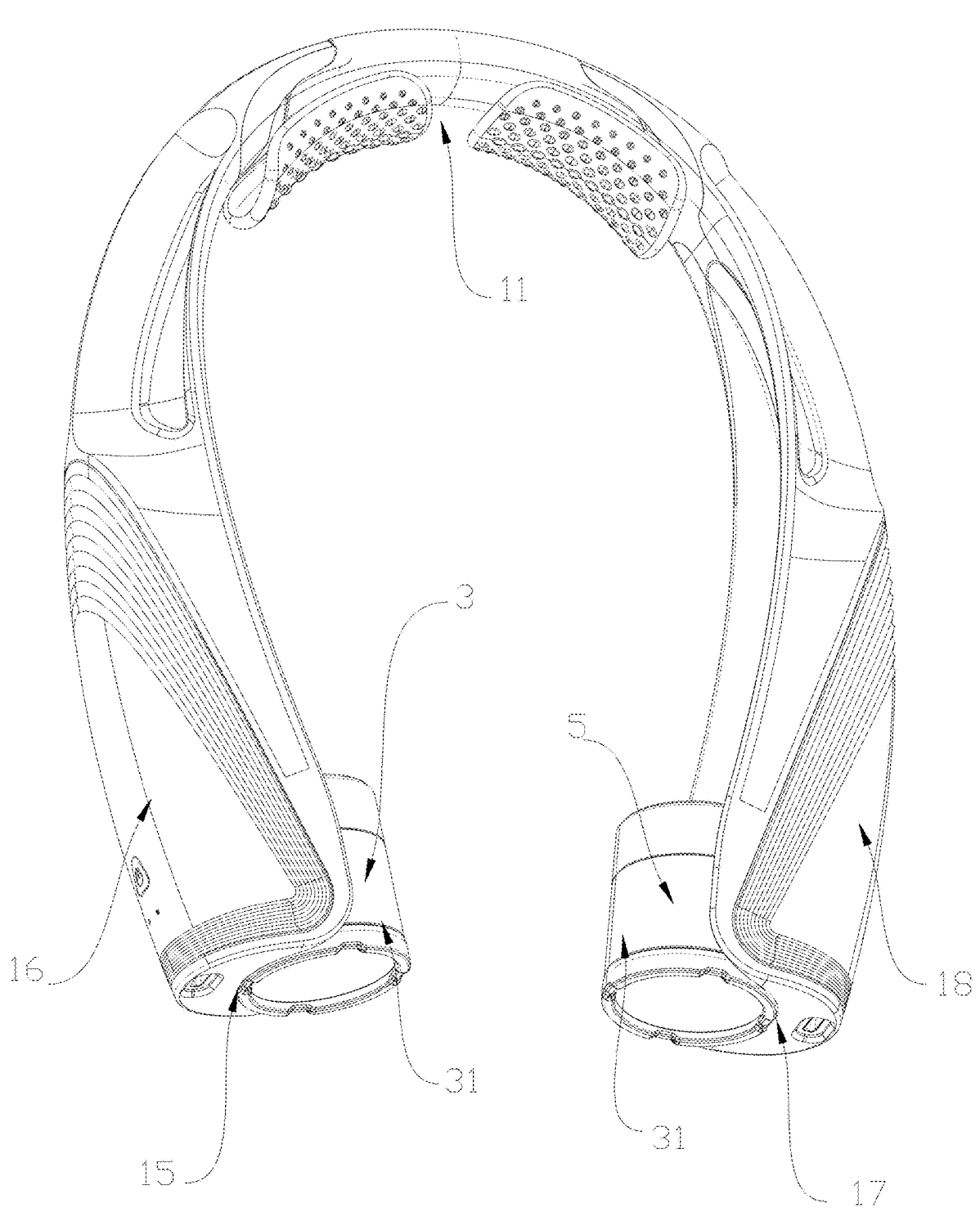
FIG. 15 is a schematic diagram of an entire structure of Embodiment III of the present disclosure.
Figure 16:
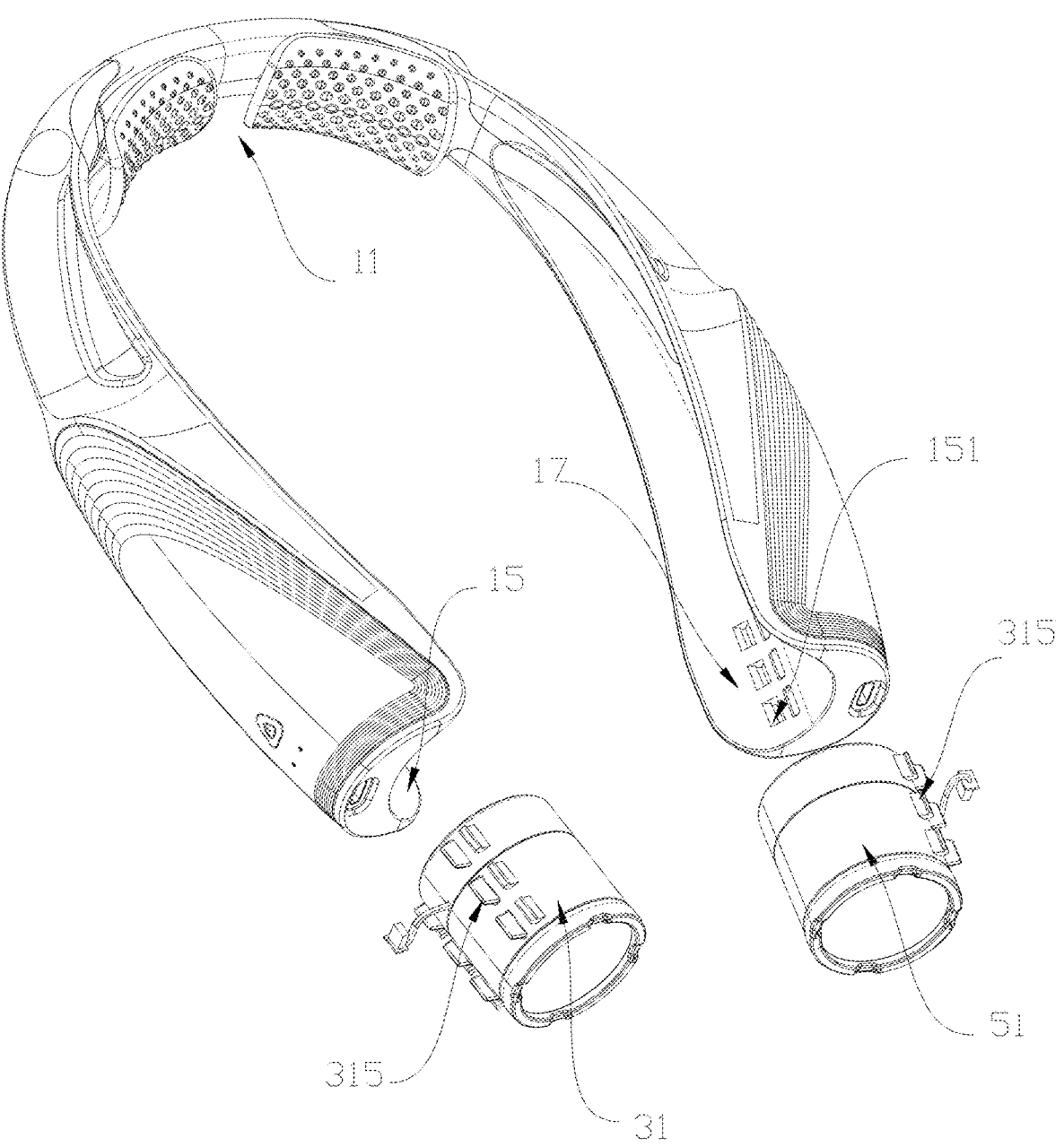
FIG. 16 is an exploded view of Embodiment III of the present disclosure.
Figure 17:
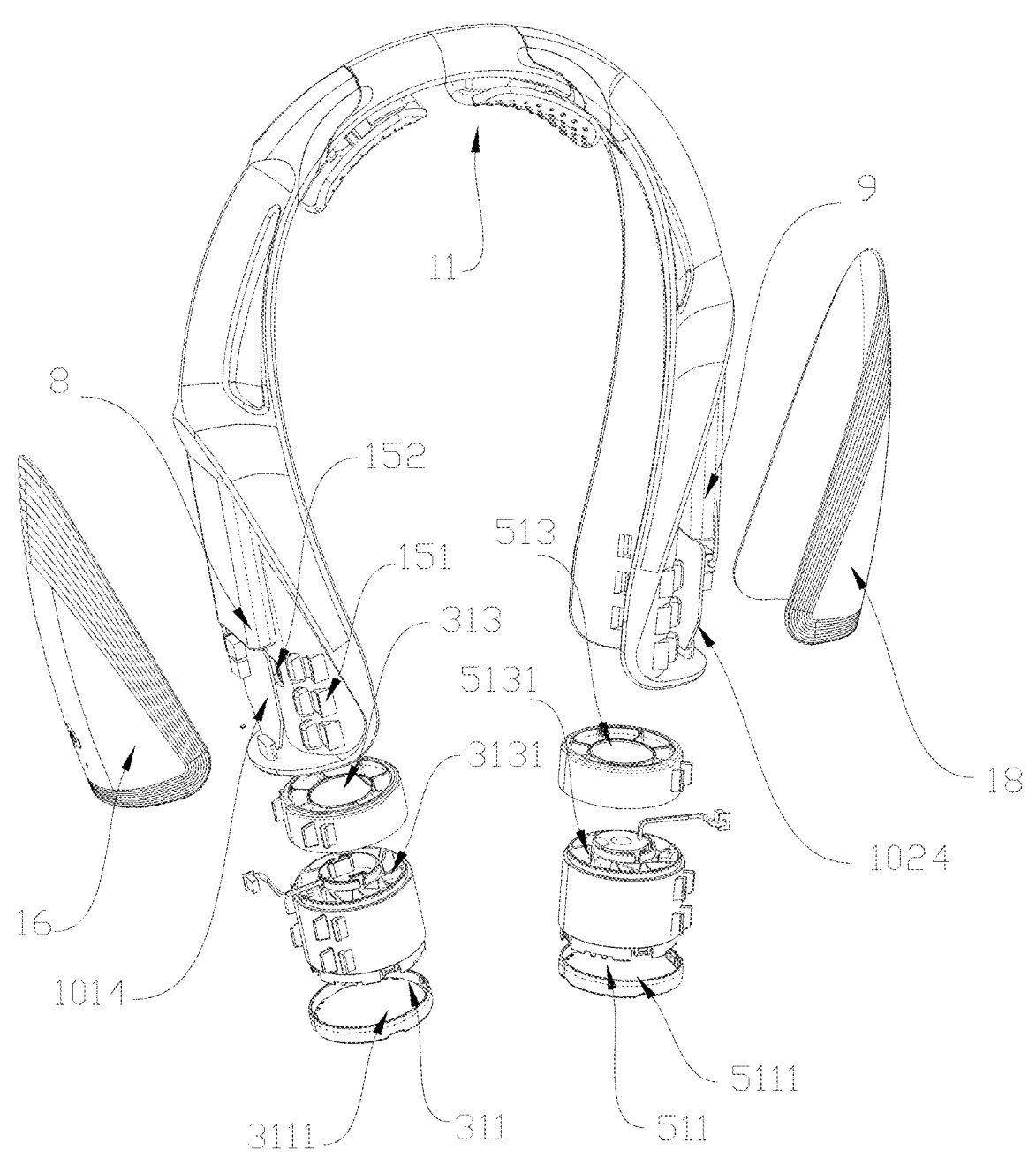
FIG. 17 is another exploded view of Embodiment III of the present disclosure.
Figure 18:
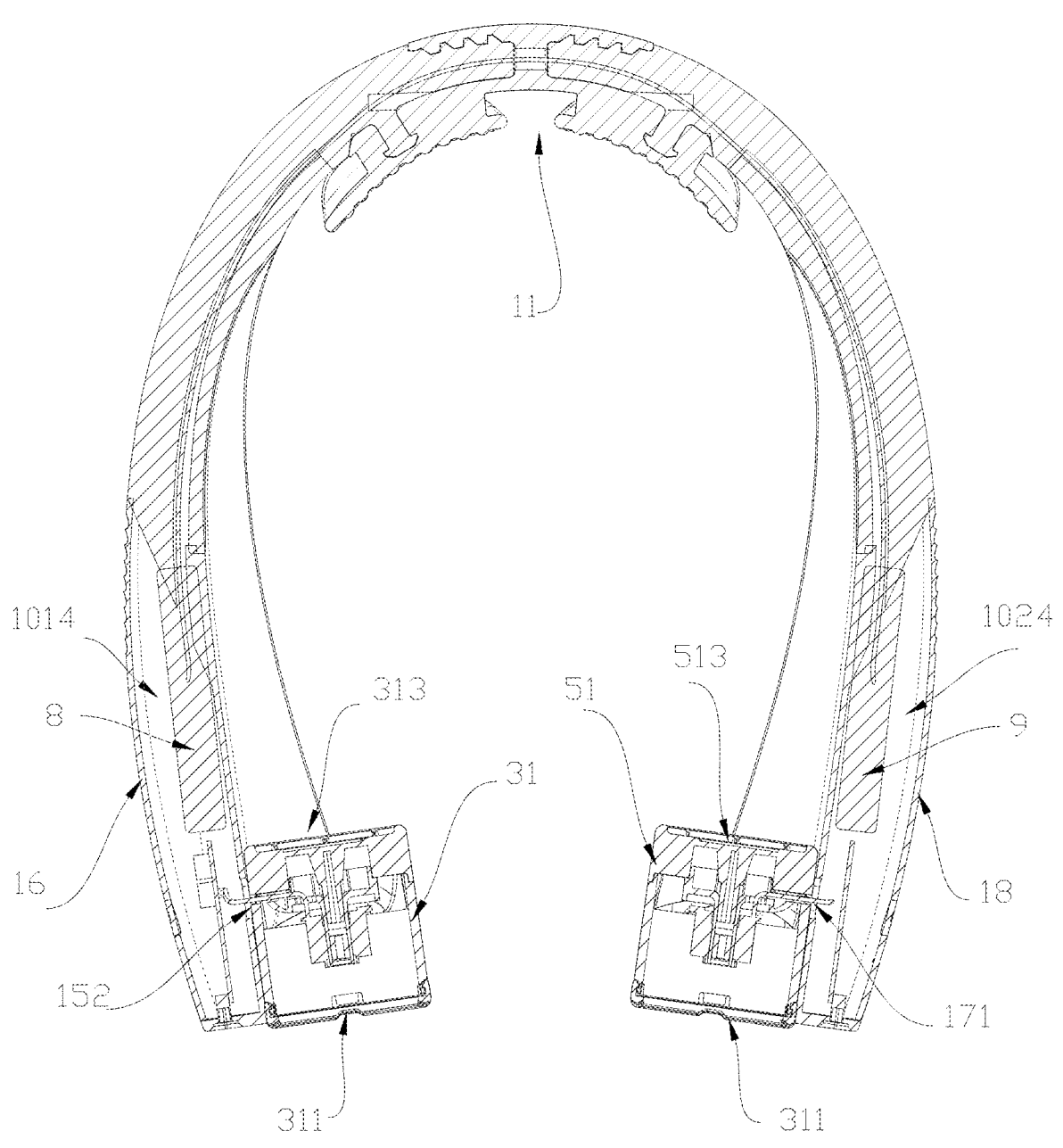
FIG. 18 is a cross-sectional view of Embodiment III of the present disclosure.

It can be understood, the first main control module 814 of FIG. 9 and the first boost module 815 may have other embodiments. Referring to FIG. 11, in other embodiment, a boost control chip U2 of the first boost module 815 can be omitted. Specially, in the embodiment of FIG. 11, the first boost module 815 includes an inductor L1 and a switch element Q2, a control terminal of an MCU of the first main control module 814 is electrically connected to a control terminal of the switch element Q2, a first connection terminal of the switch element Q2 is electrically connected to the battery BAT via the first inductor L1, and a second connection terminal of the switch element Q2 is grounded. The first connection terminal of the switch element Q2 is also electrically connected to the first motor MG1, in detail, the first connection terminal of the switch element Q2 is also electrically connected to the first motor MG1 via a diode D4. The MCU of the first main control module 814 is configured to turn on/turn off the switch element Q2, such that a voltage of the battery BAT can boost, and a boosted voltage can be provided to the first motor MG1 to drive the first fan blade 33. Further, the second main control module 924 and the second boost module 925 of FIG. 5 also can have the same structure of the first boost module 815 and the first main control module 814 of FIG. 11, such that another boosted voltage can be provided to the second motor to drive the second fan blade 53.

Embodiment II

Referring to FIG. 6 to FIG. 14, a difference between Embodiment II and Embodiment I is only that the first bracket 101 and the second bracket 102 of the neck fan are removed to form two independent fans, so that the first bracket 101 and the second bracket 102 are two small fans capable of working alone.

In this embodiment, the first bracket 101 includes a first charging control module 811, a first battery protection module 812, a first charging indicator module 813, a first main control module 814, and a first boost module 815 which are electrically connected to the first circuit board 82.

The first charging interface 1016, the first charging control module 811, and the first charging indicator lamp module 813 are all electrically connected to the first battery 81; the first charging interface 1016 and the first charging control module 811 are configured to charge the first battery 81; the first charging indicator lamp module 813 is configured to display a battery level of the first battery 81; and the first battery protection module 812 is electrically connected to the first charging control module 811 and the first battery 81 to protect the first battery 81.

The first main control module 814, the first boost module 815, and a first motor 32 are all electrically connected to the first battery 81; the first button switch 1015 and the first indicator lamp module 1017 are electrically connected to the first main control module 814; the first button switch 1015 is configured to send a first fan working signal; the first main control module 814 is configured to: receive the first fan working signal and drive the first boost module 815 to receive and boost an output voltage of the first battery 81, to drive the first motor 32 to work; and the first indicator lamp module 1017 is configured to display turning on or turning off of the neck fan.

Through the above structure, the first charging interface 1016 is configured to charge the first battery 81; the first charging control module 811 is configured to control the charging of the first battery 81; when the first button switch 1015 is turned on, the first fan working signal is sent; when receiving the first fan working signal, the first main control module 814 is configured to drive the first boost module 815 to receive and boost the output voltage of the first battery 81, to drive the first motor 32 to work; and the first main control module 814 can further adjust the speed of the first motor 32 by controlling the output voltage of the first boost module 815.

In this embodiment, the second bracket 102 includes a second charging control module 921, a second battery protection module 922, a second charging indicator module 923, a second main control module 924, and a second boost module 925 which are electrically connected to the second circuit board 92.

The second charging interface 1026, the second charging control module 921, and the second charging indicator lamp module 923 are all electrically connected to the second battery 91; the second charging interface 1026 and the second charging control module 921 are configured to charge the second battery 91; the first charging indicator lamp module 923 is configured to display a battery level of the second battery 91; and the second battery protection module 922 is electrically connected to the second charging control module 921 and the second battery 91 to protect the second battery 91.

The second main control module 924, the second boost module 925, and a second motor 52 are all electrically connected to the second battery 91; the second button switch 1025 and the second indicator lamp module 1027 are electrically connected to the second main control module 924; the second button switch 1025 is configured to send a second fan working signal; the second main control module 924 is configured to: receive the second fan working signal and drive the second boost module 925 to receive and boost an output voltage of the second battery 91, to drive the second motor 52 to work; and the second indicator lamp module 1027 is configured to display turning on or turning off of the neck fan.

Through the above structure, the second charging interface 1026 is configured to charge the second battery 91; the second charging control module 921 is configured to control the charging of the second battery 91; when the second button switch 1025 is turned on, the second fan working signal is sent; when receiving the second fan working signal, the second main control module 924 is configured to drive the second boost module 925 to receive and boost the output voltage of the second battery 91, to drive the second motor 52 to work; and the second main control module 924 can further adjust the speed of the second motor 52 by controlling the output voltage of the second boost module 925. This structural design achieves an effect of using independent portions as independent fans after the neck fan is disassembled, bringing higher flexibility, and a user can select an appropriate usage method according to a specific need.

Embodiment III

Referring to FIG. 15 to FIG. 18, the neck fan includes a hanging main body 1, wherein the hanging main body 1 includes an inner end portion 11 that is in contact with the neck of a user; a first accommodating chamber 15 is inwards sunken in one side, close to an inner end portion, of a lower end portion of the hanging main body 1; and a first fan assembly 3, wherein the first fan assembly 3 includes a straight-tube-shaped first fan shell 31. The first fan shell 31 is detachably connected to the hanging main body 1 and is located in the first accommodating chamber 15; the first fan shell 31 is provided with a third air inlet 311 and a third air outlet 313; and the first fan assembly 3 is configured to drive an air flow to be blown from the third air inlet 311 towards the inner end portion 11 via the third air outlet 313.

Through the above structure, due to the straight-tube shape of the first fan shell 31, the neck fan is formed into a vertical blowing type fan capable of blowing air in a vertical direction. The first fan assembly 3 can drive the air flow to be blown from the third air inlet towards the inner end portion 11 via the third air outlet, greatly improving the air blowing efficiency. A user can directly feel the cool air blown directly to the neck when using the neck fan, thereby improving the overall performance of the fan. Furthermore, the first fan shell is detachably connected and assembled with the hanging main body, so that separate mold opening, machining, and assembling can be achieved during production. The production efficiency is improved; the production cost is reduced; it is also convenient for storage and transportation; and the portability of the product is improved.

In this embodiment, several connection buckle slots 151 are provided in an inner side of the hanging main body 1 close to the first accommodating chamber 15; several connection buckles 315 matched and clamped with the connection buckle slots 151 are arranged on an outer wall of the first fan shell 31; and the first fan shell 31 is in detachably buckled connection to the hanging main body 1. Specifically, the connection buckle slots 151 are symmetrically distributed on an inner side of the hanging main body 1. There are six groups of connection buckle slots 151. Each group includes two connection buckle slots 151. The connection buckles 315 are symmetrically located on the outer wall of the first fan shell 31. There are six groups of connection buckles 315, and each group includes two connection buckles 315. Through the above structure, a user can manually mount or remove the first fan shell onto or from the hanging main body. The six groups of buckle matching structures ensure the firmness of splicing, prevent the first fan shell from being separated during wearing and use, and improve the safety and convenience of the neck fan.

In this embodiment, the hanging main body 1 is detachably connected with a first outer cover 16 on an outer side away from the first accommodating chamber 15. As in Embodiment I, the first bracket 101 of the hanging main body is provided with a first mounting chamber 1014, and the first power supply assembly 8 is located inside the first mounting chamber 1014. The first mounting chamber 1014 has an opening, and the first outer cover 16 is detachably covered at the opening.

In this embodiment, the first fan assembly 3 further includes a first motor 32 and a first fan blade 33 mounted on a rotating shaft of the first motor 32. A first barrier net 3111 is connected to the third air inlet 311. A first air gathering ring 3131 is connected to the third air outlet 313. The first barrier net 3111 can prevent hairs or debris from being sucked into the first fan shell, thereby avoiding damage to the fan assembly and reducing the wind force of blowing of the fan. The first air gathering ring 3131 can gather the air blown towards the neck, thereby improving the blowing performance.

In this embodiment, a first conductive through hole 152 is provided in an inner side of the hanging main body close the first accommodating chamber 15. The first conductive through hole 152 is configured to allow a wire of the first fan assembly 3 to pass through to be communicated to the first power supply assembly 8.

Through the above structure, when the neck fan needs to be assembled, the first outer cover 16 is first opened, and then the wire of the first fan assembly 3 is communicated to the first power supply assembly 8 in the first mounting chamber 1014 through the first conductive through hole 152. Then, the first outer cover 16 is closed. After the wire of the first fan assembly 3 is connected, the first fan shell is assembled with the hanging main body through the buckling between the connection buckles 315 and the connecting buckle slots 151, and finally a vertical blowing type neck fan that is conductive with the hanging main body and easy to mount is obtained.

In this embodiment, a second accommodating chamber 17 is further inwards sunken in one side, opposite to the first accommodating chamber 15, of the lower end portion of the hanging main body. The neck fan further includes a second fan assembly 5. The second fan assembly 5 includes a straight-tube-shaped second fan shell. The second fan shell is detachably connected to the hanging main body and is located in the second accommodating chamber 17. The second fan shell is provided with a fourth air inlet 511 and a fourth air outlet 513. The first fan assembly 5 is configured to drive an air flow to be blown from the fourth air inlet 511 towards the inner end portion via the fourth air outlet 513. Through the above structure, similarly, due to the straight-tube shape of the second fan shell 51, the neck fan is formed into a vertical blowing type fan capable of blowing air in a vertical direction. The second fan assembly can drive the air flow to be blown from the fourth air inlet 511 towards the inner end portion 11 via the fourth air outlet 513, greatly improving the air blowing efficiency. A user can directly feel the cool air blown directly to the neck when using the neck fan, thereby improving the overall performance of the fan. Furthermore, the second fan shell 51 is detachably connected and assembled with the hanging main body 1, so that separate mold opening, machining, and assembling can be achieved during production. The production efficiency is improved; the production cost is reduced; it is also convenient for storage and transportation; and the portability of the product is improved.

In this embodiment, several connection buckle slots 151 are provided in an inner side of the hanging main body close to the second accommodating chamber 17; several connection buckles 315 matched and clamped with the connection buckle slots 151 are arranged on an outer wall of the second fan shell 51; and the second fan shell 51 is in detachably buckled connection to the hanging main body 1. Specifically, the connection buckle slots 151 are symmetrically distributed on an inner side of the hanging main body. There are six groups of connection buckle slots 151. Each group includes two connection buckle slots 151. The connection buckles 315 are symmetrically located on the outer wall of the second fan shell. There are six groups of connection buckles 315, and each group includes two connection buckles 315.

In this embodiment, the hanging main body is detachably connected with a second outer cover 18 on an outer side away from the second accommodating chamber 17. As in Embodiment I, the second bracket 102 of the hanging main body 1 is provided with a second mounting chamber 1024, and the second power supply assembly 9 is located inside the second mounting chamber 1024. The second mounting chamber 1024 has an opening, and the second outer cover 18 is detachably covered at the opening.

Further, the second fan assembly 5 further includes a second motor 52 and a second fan blade 53 mounted on a rotating shaft of the second motor. A second barrier net 5111 is connected to the fourth air inlet 511. A second air gathering ring 5131 is connected to the fourth air outlet 513.

In this embodiment, a second conductive through hole 171 is provided in an inner side of the hanging main body close the second accommodating chamber 17. The second conductive through hole 171 is configured to allow a wire of the second fan assembly 5 to pass through to be communicated to the second power supply assembly 9.

Through the above structure, after the assembling of the first fan shell 31 is completed, the second fan shell 51 is mounted in the same way. The second outer cover 18 is first opened, and then the wire of the second fan assembly 5 is communicated to the second power supply assembly 9 in the second mounting chamber 1024 through the second conductive through hole 171. Then, the second outer cover 18 is closed. After the wire of the second fan assembly 5 is connected, the second fan shell 51 is assembled with the hanging main body 1 through the buckling between the connection buckles 315 and the connecting buckle slots 151, and finally a vertical blowing type neck fan that is conductive with the hanging main body 1 and easy to mount is obtained.

In this embodiment, all other structures and functions are the same as those in Embodiment I.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A neck fan, comprising:

a hanging main body (1), wherein the hanging main body (1) comprises an inner end portion (11) that is configured to be in contact with a user's neck;

a first fan assembly (3), wherein the first fan assembly (3) comprises a straight-tube-shaped first fan shell (31); the first fan shell (31) is connected to a lower end portion of the hanging main body; the first fan shell (31) is provided with an air inlet and an air outlet; and the first fan assembly (3) is configured to drive an air flow to be blown from the air inlet (311) towards the inner end portion (11) via the air outlet (313); and a first power supply assembly (8), wherein the first power supply assembly (8) is located inside the hanging main body (1), the first power supply assembly (8) is electrically connected to the first fan assembly (3) to supply power to the first fan assembly (3);

wherein the hanging main body (1) comprises a first bracket (101), a second bracket (102), and a bracket connector (103); the first bracket (101) is detachably connected to the second bracket (102) through the bracket connector (103); and the first power supply assembly (8) is arranged along a lengthwise direction of the first bracket (101);

wherein a straight-tube-shaped first air guide chamber (2) is arranged at the lower end portion of the first bracket (101) in a protruding manner; the first air guide chamber (2) comprises a first air inlet (22) arranged at the lower end portion of the first bracket (101) and a first air outlet (23) opposite to the first air inlet (22); the first air outlet (23) faces the inner end portion (11); the first fan assembly (3) is located in the first air guide chamber (2); and the first fan assembly (3) is configured to drive an air flow to be blown from the first air inlet (22) towards the inner end portion (11) via the first air outlet (23).

2. The neck fan according to claim 1, wherein a first accommodating chamber (15) is inwards sunken in one side of the lower end portion of the hanging main body (1); and the first fan shell (31) is detachably connected to the hanging main body (1) and is located in the first accommodating chamber (15).

3. The neck fan according to claim 2, wherein several connection buckle slots (151) are provided in an inner side of the hanging main body (1) in the first accommodating chamber (15); several connection buckles (315) matched and clamped with the connection buckle slots (151) are arranged on an outer wall of the first fan shell (31); and the first fan shell (31) is in detachably buckled connection to the hanging main body (1).

4. The neck fan according to claim 1, wherein the neck fan is provided with a first air guide path (12) that is inwards sunken; the first air guide path (12) extends from the first air outlet (23) to the inner end portion (11); and the first fan assembly (3) drives the air flow to be blown out from the first air outlet (23) towards the inner end portion (11) along the first air guide path (12).

5. The neck fan according to claim 4, wherein a width of the first air guide path (12) gradually decreases towards the inner end portion (11) along the first air outlet (23); a width range of the first air guide path (12) is 1 to 5 cm; a length range of the first air guide path (12) is 8 to 16 cm; and a depth range of the first air guide path (12) is 0 to 3 cm.

6. The neck fan according to claim 4, wherein a flexible first neck support (111) is connected to the inner end portion (11); a first air inlet gap (121) is formed between the first neck support (111) and the inner end portion (11); the first fan assembly (3) drives the air flow to be blown out from the first air outlet (23) towards the first air inlet gap (121) along the first air guide path (12).

7. The neck fan according to claim 4, wherein the neck fan comprises a first outer shell (1011) and a first inner shell (1012); the first air guide path (12) is arranged on the first inner shell (1012); and the first inner shell (1012) is in detachably buckled connection to the first outer shell (1011).

8. The neck fan according to claim 4, wherein a straight-tube-shaped second air guide chamber (4) is further arranged at a lower end portion of the neck fan in a protruding manner; the second air guide chamber (4) comprises a second air inlet (42) arranged at the lower end portion of the hanging main body (1) and a second air outlet (43) opposite to the second air inlet (42); the second air outlet (43) faces the inner end portion (11); a second fan assembly (5) is arranged in the second air guide chamber (4); and the second fan assembly (5) is configured to drive the air flow to be blown out from the second air inlet (42) towards the inner end portion (11) via the second air outlet (43).

9. The neck fan according to claim 8, wherein the neck fan is provided with a second air guide path (13) that is inwards sunken; the second air guide path (13) extends from the second air outlet (43) towards the inner end portion (11); the second fan assembly (5) drives the air flow to be blown out from the second air outlet (43) towards the inner end portion (11) along the second air guide path (13); a width of the second air guide path (13) gradually decreases towards the inner end portion (11) along the second air outlet (43); a width range of the second air guide path (13) is 1 to 5 cm; a length range of the second air guide path (13) is 8 to 16 cm; and a depth range of the second air guide path (13) is 0 to 3 cm.

10. The neck fan according to claim 9, wherein a flexible second neck support (112) is connected to the inner end portion (11); a second air inlet gap (131) is formed between the second neck support (112) and the inner end portion (11); the second fan assembly (5) drives the air flow to be blown out from the second air outlet (43) towards the second air inlet gap (131) along the second air guide path (13).

11. The neck fan according to claim 9, wherein the neck fan comprises a second outer shell (1021) and a second inner shell (1022); the second air guide path (13) is arranged on the second inner shell (1022); and the second inner shell (1022) is in detachably buckled connection to the second outer shell (1021).

12. The neck fan according to claim 8, the first power supply assembly (8) comprises a first battery (81) and a first circuit board (82); and the first battery (81) is electrically connected to the first circuit board (82) to supply power to the first circuit board (82); the neck fan further comprises a second power supply assembly (9); the second power supply assembly (9) is located inside the hanging main body (1); the second power supply assembly (9) is electrically connected to the second fan assembly (5) to supply power to the second fan assembly (5); the second power supply assembly (9) comprises a second battery (91) and a second circuit board (92); and the second battery (91) is electrically connected to the second circuit board (92) to supply power to the second circuit board (92).

13. The neck fan according to claim 12, wherein the first fan assembly (3) comprises a first motor (32) and a first fan blade (33) mounted on a rotating shaft of the first motor (32); the first air inlet (22) is connected with a first air inlet hood (221); the first air inlet hood (221) is provided with several first air inlet holes (222); the first air outlet (23) is connected to a first air outlet hood (231); and the first air outlet hood (231) is provided with several first air outlet holes (232).

14. The neck fan according to claim 12, wherein the second fan assembly (5) comprises a second motor (52) and a second fan blade (53) mounted on a rotating shaft of the second motor (52); the second air inlet (42) and a fourth air inlet (511) are connected with a second air inlet hood (421); the second air inlet hood (421) is provided with several second air inlet holes (422); the second air outlet (43) and a fourth air outlet (513) are connected with a second air outlet hood (431); and the second air outlet hood (431) is provided with several second air outlet holes (432).

15. The neck fan according to claim 12, wherein the hanging main body (1) is a U-shaped hanging main body (1); the hanging main body (1) comprises a first bracket (101), a second bracket (102), and a bracket connector (103); the first bracket (101) is detachably connected to the second bracket (102) through the bracket connector (103); and the bracket connector is a flexible bracket connector (103); the bracket connector (103) is provided with a mounting through hole (1031); the first bracket (101) is provided with a first connection end (1013) connected to the bracket connector (103); the first connection end (1013) is detachably inserted into one end of the mounting through hole (1031); the second bracket (102) is provided with a second connection end (1023) connected to the bracket connector (103); and the second connection end (1023) is detachably inserted into the other end of the mounting through hole (1031).

16. The neck fan according to claim 14, wherein a concave-convex first buckle (10131) is arranged at the first connection end (1013); the bracket connector (103) is provided with a first buckle slot (1032) that is matched and clamped with the first buckle (10131); a concave-convex second buckle (10331) is arranged at the second connection end (1023); and the bracket connector (103) is provided with a second buckle slot (10231) that is matched and clamped with the second buckle (10331).

17. The neck fan according to claim 16, wherein the first air guide chamber (2) is located inside the first bracket (101); the first bracket (101) is further provided with a first mounting chamber (1014); the first power supply assembly (8) is located inside the first mounting chamber (1014); the second air guide chamber (4) is located inside the second bracket (102); the second bracket (102) is further provided with a second mounting chamber (1024); and the second power supply assembly (9) is located inside the second mounting chamber (1024).

18. The neck fan according to claim 17, wherein the first bracket (101) is further provided with a first button switch (1015), a first charging interface (1016), and a first indicator lamp module (1017); the first button switch (1015), the first charging interface (1016), and the first indicator lamp module (1017) are all electrically connected to the first power supply assembly (8); the second bracket (102) is further provided with a second button switch (1025), a second charging interface (1026), and a second indicator lamp module (1027); and the second button switch (1025), the second charging interface (1026), and the second indicator lamp module (1027) are all electrically connected to the second power supply assembly (9).

19. The neck fan according to claim 17, wherein the neck fan further comprises a first charging control module (811), a first battery protection module (812), a first charging indicator module (813), a first main control module (814), and a first boost module (815) which are electrically connected to the first circuit board (82);

the first charging interface (1016) and the first charging control module (811) are both electrically connected to the first battery (81); the first charging indicator module (813) is connected to the first charging control module (811); the first charging interface (1016) and the first charging control module (811) are configured to charge the first battery (81); the first charging indicator module (813) is configured to display a state of charging; the first battery protection module (812) is electrically connected to the first charging control module (811) and the first battery (81) to protect the first battery (81); the first main control module (814), the first boost module (815), and the first motor (32) are all electrically connected to the first battery (81); the first button switch (1015) and the first indicator lamp module (1017) are electrically connected to the first main control module (814); the first button switch (1015) is configured to send a first fan working signal; the first main control module (814) is configured to: receive the first fan working signal and drive the first boost module (815) to receive and boost an output voltage of the first battery (81), to drive the first motor (32) to work; the first indicator lamp module (1017) is configured to display turning on or turning off of the neck fan;

the neck fan further comprises a second charging control module (921), a second battery protection module (922), a second charging indicator module (923), a second main control module (924), and a second boost module (925) which are electrically connected to the second circuit board (92);

the second charging interface (1026) and the second charging control module (921) are both electrically connected to the second battery (91); the second charging indicator module (913) is connected to the second charging control module (921); the second charging interface (1026) and the second first charging control module (921) are configured to charge the second battery (91); the second charging indicator lamp module (923) is configured to display a state of charging; the second battery protection module (922) is electrically connected to the second charging control module (921) and the second battery (91) to protect the second battery (91);

the second main control module (924), the first boost module (925), and the second motor (52) are all electrically connected to the second battery (91); the second button switch (1025) and the second indicator lamp module (1027) are electrically connected to the second main control module (924); the second button switch (1025) is configured to send a second fan working signal; the second main control module (924) is configured to: receive the second fan working signal and drive the first boost module (925) to receive and boost an output voltage of the first battery (91), to drive the second motor (52) to work; and the second indicator lamp module (1027) is configured to display turning on or turning off of the neck fan.

20. A neck fan, comprising:

a hanging main body (1), wherein the hanging main body (1) comprises an inner end portion (11) that is configured to be in contact with a user's neck; and a first fan assembly (3), wherein the first fan assembly (3) comprises a straight-tube-shaped first fan shell (31); the first fan shell (31) is connected to a lower end portion of the hanging main body; the first fan shell (31) is provided with an air inlet and an air outlet; and the first fan assembly (3) is configured to drive an air flow to be blown from the air inlet (311) towards the inner end portion (11) via the air outlet (313);

wherein a first accommodating chamber (15) is inwards sunken in one side of the lower end portion of the hanging main body (1); and the first fan shell (31) is connected to the hanging main body (1) and is located in the first accommodating chamber (15);

wherein a plurality of connection buckle slots (151) are provided in an inner side of the hanging main body (1) in the first accommodating chamber (15); a plurality of connection buckles (315) matched and clamped with the connection buckle slots (151) are arranged on an outer wall of the first fan shell (31); and the first fan shell (31) is in buckled connection to the hanging main body (1).

\* \* \* \* \*